United States Patent [19]
Ang et al.

[11] Patent Number: 6,091,322
[45] Date of Patent: Jul. 18, 2000

[54] TRUNK MONITORING SYSTEM

[75] Inventors: Leoncio C. Ang, Bloomfield Hills; Robert F. Bennett, Clarkston; James F. Clisham, Farmington Hills, all of Mich.

[73] Assignee: DaimlerChrysler Corporation, Auburn Hills, Mich.

[21] Appl. No.: 09/396,894

[22] Filed: Sep. 15, 1999

[51] Int. Cl.$^7$ ...................................................... B60Q 1/00
[52] U.S. Cl. ........................ 340/425.5; 340/426; 340/825; 340/692; 381/86; 381/56; 381/105
[58] Field of Search ................................ 340/425.5, 426, 340/825.69, 825, 692, 691.3, 565, 825.72; 381/302, 56, 86, 104, 105, 107, 109; 341/173, 176

[56] References Cited

U.S. PATENT DOCUMENTS

| | | | |
|---|---|---|---|
| 4,367,461 | 1/1983 | Gauchard | 340/573 |
| 4,988,980 | 1/1991 | Graham | 340/692 |
| 5,289,162 | 2/1994 | McDaniel | 340/521 |
| 5,315,285 | 5/1994 | Nykerk | 340/426 |
| 5,451,930 | 9/1995 | McDaniel | 340/521 |
| 5,517,176 | 5/1996 | Lavelle et al. | 340/542 |
| 5,598,141 | 1/1997 | Grasmann et al. | 340/426 |
| 5,726,629 | 3/1998 | Yu | 340/565 |
| 5,793,291 | 8/1998 | Thornton | 340/573 |
| 5,854,588 | 12/1998 | Dockery | 340/541 |
| 5,859,479 | 1/1999 | David | 307/10.8 |
| 5,886,630 | 3/1999 | Menoud | 340/540 |

*Primary Examiner*—Daniel J. Wu
*Assistant Examiner*—Tai T. Nguyen
*Attorney, Agent, or Firm*—Marc Lorelli

[57] ABSTRACT

A device and method for monitoring a vehicle storage compartment for the presence of a confined individual includes at least one sensor adapted for sensing the presence of a living being confined in a vehicle storage compartment and generating a sensor signal in response thereto and a controller coupled to the at least one sensor and generating an actuation signal in response to the sensor signal. The actuation signal may be used to automatically open the vehicle storage compartment and/or to cause an audible warning device coupled to the controller to produce a predetermined warning in response to the actuation signal. The actuation signal may also be used to produce a visual signal which draws attention to the vehicle.

25 Claims, 2 Drawing Sheets

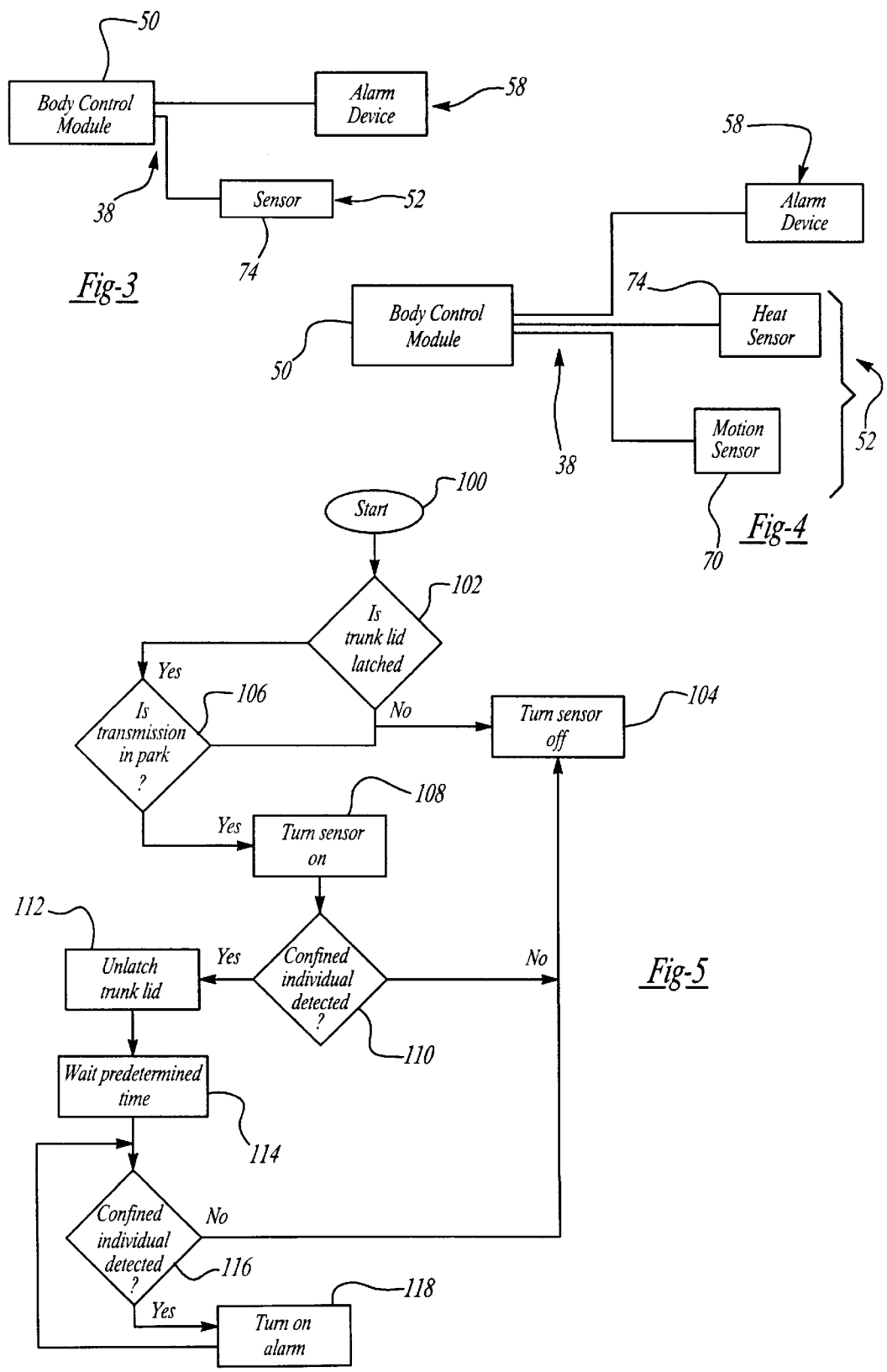

TRUNK MONITORING SYSTEM

BACKGROUND OF THE INVENTION

1. Technical Field

The present invention relates generally to vehicle storage compartments and more particularly to a device to monitor a vehicle storage compartment, such as a trunk, to determine the presence of an occupant.

2. Discussion

U.S. Pat. No. 5,859,479 to David teaches an anti-confinement device for a vehicle trunk which alerts others to the condition of a confined individual as well as opens the trunk lid. The device disclosed by U.S. Pat. No. 5,859,479 enables a vehicle trunk to be opened from the interior of the trunk and enables at least one of the tail lights to blink.

SUMMARY OF THE INVENTION

It is a general object of the present invention to provide a device for monitoring a vehicle storage compartment for a confined individual.

It is another object of the present invention to provide a device for monitoring a vehicle storage compartment which communicates the status of the confined individual and the location of the vehicle.

It is a further object of the present invention to provide a device for automatically unlatching a vehicle storage compartment when a confined individual is detected therein.

It is yet another object of the present invention to provide a method for monitoring a vehicle storage compartment and alerting others outside a vehicle storage compartment when an individual is confined in the vehicle storage compartment.

A device and method for monitoring a vehicle storage compartment for the presence of a confined individual is disclosed herein. The device includes at least one sensor adapted for sensing the presence of a living being confined in a vehicle storage compartment and generating a sensor signal in response thereto and a controller coupled to the at least one sensor and generating an actuation signal in response to the sensor signal. The actuation signal may be used to automatically open the vehicle storage compartment and/or to cause an audible warning device coupled to the controller to produce a predetermined warning in response to the actuation signal. The actuation signal may also be used to produce a visual signal indicating which draws attention to the vehicle.

Additional advantages and features of the present invention will become apparent from the subsequent description and the appended claims, taken in conjunction with the accompanying drawings.

BRIEF DESCRIPTION OF THE DRAWINGS

FIG. 3 is a schematic view of the device of the present invention;

FIG. 4 is a schematic view of the device of another preferred embodiment of the present invention; and FIG. 5 is a schematic view of the method of the present invention in flow chart form.

DETAILED DESCRIPTION OF THE PREFERRED EMBODIMENT

Figure 1:
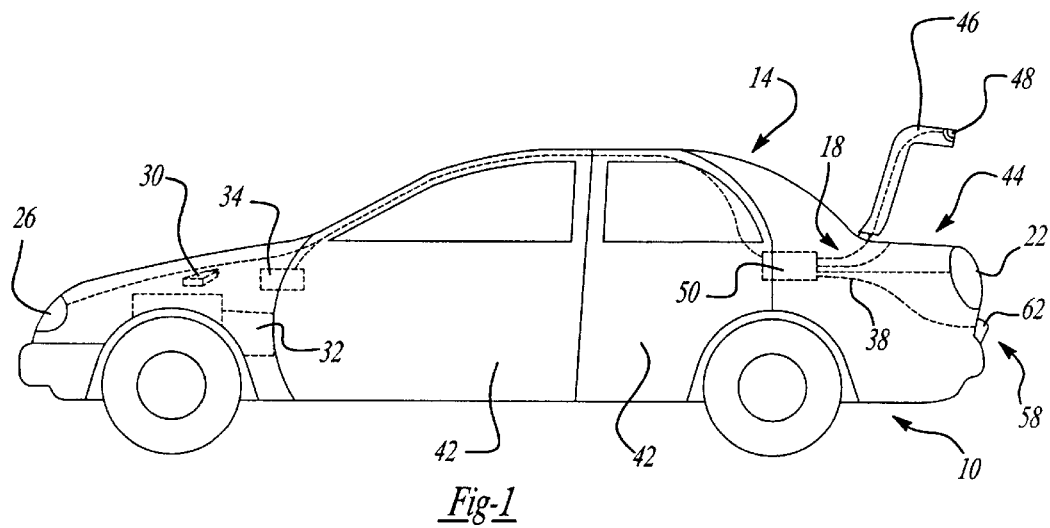
FIG. 1 is a side view of a vehicle constructed in accordance with the teachings of the present invention.

With reference to FIG. 1 of the drawings, an exemplary vehicle constructed in accordance with the teachings of the present invention is generally indicated by reference numeral 10. Vehicle 10 is shown to include a vehicle body 14, a confinement warning device 18, a rear brake light 22, a headlight 26, a vehicle horn 30, a vehicle transmission 32, a control module 34, a wire harness 38 and a plurality of vehicle doors 42. Vehicle body 14 conventionally defines a storage cavity 44, such as a trunk, which is container-like in shape and has at least one surface. Vehicle body 14 further includes a pivoting closure member 46 operable in a closed position for substantially closing storage cavity 44 and an open position for substantially clearing storage cavity 44. A latch mechanism 48 is coupled to closure member 46 and operable in a latched condition for latching closure member 46 in the closed position and an unlatched condition for permitting closure member 46 to be positioned in the open position.

Figure 2:
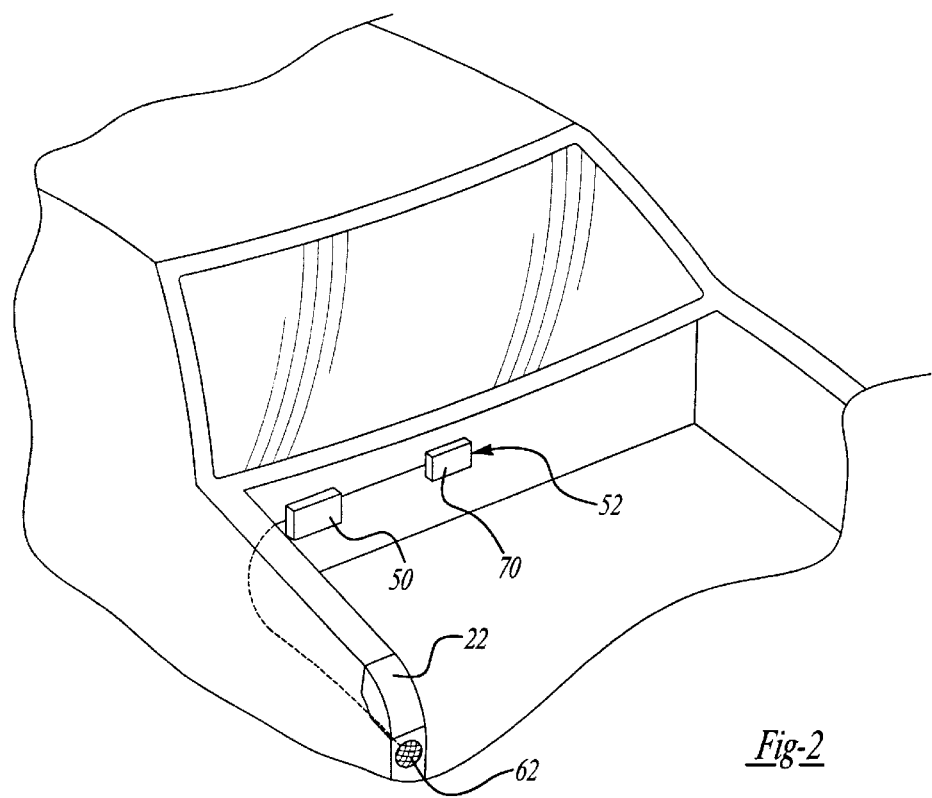
FIG. 2 is a perspective rear view of the vehicle of FIG. 1.

With additional reference to FIGS. 2 through 4, confinement warning device 18 is shown to include a body control module 50, at least one sensor 52 operable for detecting the presence of a living being, and an alarm device 58, such as external speaker 62. Body control module 50 is coupled to latch mechanism 48 through wire harness 38 and is operable for determining whether latch mechanism 48 is in the latched or unlatched condition. Preferably, body control module 50 is also operable for generating an unlatch signal which causes latch mechanism 48 to be positioned in the unlatched condition. Body control module 50 is also coupled through wire harness 38 to control module 34 and alarm device 58. Body control module 50 is fixedly coupled to vehicle body 14.

At least one sensor 52 is shown in the example illustrated in FIG. 2 to include a conventional motion sensor operable for sensing a level of motion above a predetermined threshold corresponding to the presence of a living being and producing a motion sensor signal in response thereto. The motion sensor signal is communicated to body control module 50 through wire harness 38. Preferably, the predetermined motion threshold is adjustable, either automatically or manually, to allow the operation of motion sensor 70 to be tailored in a desired manner.

In response to receiving the motion sensor signal, body control module 50 is operable for generating an actuation signal. Depending upon the desired configuration of warning device 18, the actuation signal may consist of the unlatch signal, operable for causing latch mechanism 48 to be positioned in the unlatched condition and/or an alarm signal, which is communicated through wire harness 38 to alarm device 58. In response to receiving the alarm signal, alarm device 58 actuates to alarm individuals located outside vehicle storage cavity 44. If the actuation signal is to include the unlatch signal and the alarm signal, those skilled in the art should readily appreciate that the unlatch signal and alarm signal may be generated simultaneously or may be generated so that one proceeds the other by a predetermined delay time.

In the particular embodiment illustrated, the actuation signal consists of an electronic signal that permits external speaker 62 to produce a verbal message, such as "A person is trapped inside the trunk of this vehicle!". The verbal message may be personalized to vehicle 10, including, for example, the particular make and model of vehicle 10, its color and/or its license plate number. Body control module 50 may be programmed to generate the actuation signal for a predetermined length of time and to repeat the actuation signal at predetermined time intervals.

Alternatively, at least one sensor 52 may include a heat sensor 74 as shown in FIG. 3. Heat sensor 74 is operable for sensing the level of heat output by objects or living beings in storage cavity 44 and producing a heat sensor signal in response to the sensing of a living being. Heat sensor 74 may sense a heat level gradient, wherein changes in the heat level gradient which are greater than a maximum gradient value cause heat sensor 74 to produce the heat sensor signal. Alternatively, heat sensor 74 may sense the absolute temperature of the heat source and produce the heat sensor signal when a heat source having a temperature within a predetermined temperature range, such as from about 90° F. to about 105° F. is detected. Preferably, the maximum gradient value and/or the predetermined temperature range are adjustable, either automatically or manually, to allow the operation of heat sensor 74 to be tailored in a desired manner.

At least one sensor 52 may alternatively include a plurality of sensors which permit confinement warning device 18 to improve the accuracy with which it is able to determine whether a living being is confined in storage compartment 44. As shown in FIG. 4, at least one sensor 52 is shown to include motion sensor 70 and heat sensor 74. Body control module 50 produces actuation signal based on a predetermined control methodology and may require one or both of the motion and heat sensor signals under certain circumstances.

Returning to FIG. 1, vehicle transmission 32 includes a plurality of selectively engagable gear settings, which typically include park, reverse, neutral, drive and low gear settings. As is well known in the art, engagement of vehicle transmission 32 into the park gear setting causes a ratchet (not shown) to engage and inhibit the movement of the vehicle wheels. Vehicle transmission 32 is coupled to controller 34 which is operable for determining the gear setting that has been engaged. As controller 34 and body control module 50 are coupled together, controller 34 is operable for communicating the engaged gear setting to body control module 50.

In FIG. 5, a control methodology for the present invention is illustrated. The methodology is entered at bubble 100 and progresses to decision block 102 where body control module 50 determines whether closure member 46 is in the closed position. This analysis typically relies on the condition of latch mechanism 48 and if latch mechanism is in an unlatched condition, it is assumed that closure member is in the open position.

If closure member 46 is in the open position, the methodology proceeds to block 104 where the at least one sensor 52 is turned off. This disables the at least one sensor 52, preventing it from generating any sensor signals. The methodology then loops back to decision block 102. If closure member 46 is in the closed position, the methodology proceeds to decision block 106 where the methodology evaluates whether transmission 32 is engaged in the park gear setting.

If transmission 32 is not engaged in the park gear setting, the methodology proceeds to block 104. If transmission 32 is engaged in the park gear setting, the methodology proceeds to block 108 where the at least one sensor 52 is turned on. This enables the at least one sensor 52 enabling it to produce sensor signals (e.g., motion sensor signal, heat sensor signal) under predetermined conditions. The methodology then proceeds to decision block 110 where the methodology determines whether the presence of a living being has been detected within a first predetermined time interval having a duration of about 2 seconds to about 15 minutes.

If the presence of a living being has not been detected within the first predetermined time interval, the methodology proceeds to block 104. If the presence of a living being has been detected in decision block 110, the methodology proceeds to block 112 where a first portion of the actuation signal is generated. In the particular embodiment illustrated, the actuation signal is generated in two stages. In the first stage, the portion of the actuation signal generated included the unlatch signal operable for causing latch mechanism 48 to be positioned in the unlatched condition. The methodology then proceeds to block 114.

In block 114, the methodology waits a predetermined time before taking further action. The predetermined time is preferably from about 2 seconds to about 15 minutes. After the predetermined time has elapsed, the methodology proceeds to decision block 116 where the methodology determines whether the presence of a living being has been detected within a second predetermined time interval having a duration of about 2 seconds to about 15 minutes. The second predetermined time interval may be equal to or may vary from the first predetermined time interval.

If the presence of a living being has not been detected within the second predetermined time interval, the methodology proceeds to block 104. If the presence of a living being has been detected in decision block 116, the methodology proceeds to block 118 where a second portion of the actuation signal is generated. The second portion of the actuation signal includes the alarm signal which is operable for actuating alarm device 58.

While the confinement warning device of the present invention has been described thus far as providing a verbal warning when the presence of an individual confined in a vehicle storage cavity is identified, those skilled in the art will appreciate that the invention, in its broader aspects, may be constructed somewhat differently. For example, alarm device 58 may also include various other vehicle equipment, such as brake light 22, headlight 26 and horn 30. Body control module 50 may be programmed to periodically actuate brake light 22, head light 26 and/or horn 30 in a predetermined manner to more effectively and efficiently communicate that there is a problem with vehicle 10. For example, body control module 50 may continuously pulse brake light 22 on and off. As another example, body control module 50 may turn headlight 22 on and toggle between the standard beam and the high-powered beam. As yet another example, body control module may pulse horn 30, stopping periodically to enable speaker 62 to produce the verbal message.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A confinement warning device for a vehicle storage compartment for warning others outside the vehicle storage compartment that a living being has been confined in said vehicle storage compartment, said confinement warning device comprising:

at least one sensor adapted for sensing the presence of said living being in said vehicle storage compartment and producing a sensor signal in response thereto, the at least one sensor including a heat sensor operable for sensing heat radiated from said living being;

a controller coupled to said at least one sensor and automatically generating an actuation signal in response to said sensor signal; and a warning device coupled to said controller and operable for producing a predetermined audible warning in response to said actuation signal.

2. The confinement warning device of claim 1, wherein said predetermined audible warning produced by said warning device includes a verbal message.

3. The confinement warning device of claim 1, wherein said warning device includes a vehicle horn.

4. The confinement warning device of claim 1, wherein said at least one sensor further includes a motion sensor operable for sensing motions of said living being which exceed a predetermined motion threshold.

5. The confinement warning device of claim 4, wherein said predetermined motion threshold is adjustable.

6. The confinement warning device of claim 1, wherein said heat sensor produces said heat sensor signal when a heat source having a temperature within a predetermined temperature range is detected.

7. The confinement warning device of claim 6, wherein said predetermined temperature range is about 90° F. to about 105° F.

8. The confinement warning device of claim 1, wherein said heat sensor produces said heat sensor signal when a temperature gradient above a predetermined maximum gradient is detected.

9. The confinement warning device of claim 1, wherein said at least one sensor further includes a motion sensor operable for sensing motions of said living being which exceed a predetermined motion threshold, wherein said actuation signal is produced only if said heat sensor senses heat in excess of said predetermined temperature threshold and said motion sensor senses motion in excess of said predetermined motion threshold.

10. The confinement warning device of claim 1, further comprising a visual warning device coupled to said controller and operable for producing a predetermined visual warning in response to said actuation signal.

11. The confinement warning device of claim 10, wherein said visual warning device includes at least one light operable for producing a beam of light in response to said actuation signal.

12. The confinement warning device of claim 11, wherein said beam of light produced by said at least one light varies in intensity over time.

13. A confinement warning device for a vehicle storage compartment having a storage cavity and a lid member, said lid member operable in a closed position substantially covering said storage cavity, said lid member also operable in an open position substantially clearing said storage cavity, said lid member including a latch mechanism operable in a latched condition for retaining said lid member in said closed position and an unlatched condition permitting said lid member to be positioned in said open position, said confinement warning device comprising:

at least one sensor adapted for sensing the presence of said living being in said vehicle storage compartment and producing a sensor signal in response thereto;

a controller coupled to said sensor and generating an actuation signal in response to said sensor signal, said actuation signal including an unlatching signal adapted for causing said latching mechanism to be positioned in said unlatched condition.

14. The confinement warning device of claim 13, wherein said at least one sensor includes a motion sensor operable for sensing motions of said living being which exceed a predetermined motion threshold.

15. The confinement warning device of claim 13, wherein said at least one sensor includes a heat sensor operable for sensing heat radiated from said living being and producing a heat sensor signal in response thereto.

16. In a vehicle having a vehicle body and a transmission having a plurality of gear settings, one of said gear settings being a park setting, said vehicle body defining a storage compartment with a compartment aperture and a closure member for selectively closing said compartment aperture, a method for warning persons outside the storage compartment that a living being is trapped within said storage compartment comprising the steps of:

providing at least one sensor adapted for sensing the presence of said living being in said storage compartment;

determining whether said closure member is positioned so as to close said storage compartment;

if said closure member is positioned so as to close said storage compartment, determining whether said transmission is engaged in said park setting;

if said transmission is engaged in said park setting, providing power to said at least one sensor; and automatically generating an audible warning if said at least one sensor senses said living being.

17. The method of claim 16, further comprising the step of generating a visual warning if said at least one sensor senses said living being.

18. The method of claim 17, wherein the step of generating a visual warning includes the steps of:

generating a beam of light of a first intensity for a first predetermined time interval; and generating a beam of light of a second intensity for a second predetermined time interval.

19. The method of claim 16, wherein said audible warning includes a verbal message.

20. The method of claim 16, wherein said audible warning is produced at least partially by a vehicle horn.

21. The method of claim 16, wherein if said closure member is not positioned so as to close said storage compartment, said at least one sensor is not operable for sensing said living being.

22. The method of claim 16, wherein if said transmission is not engaged in said park setting, said at least one sensor is not operable for sensing said living being.

23. The method of claim 16, wherein said at least one sensor includes a heat sensor.

24. The method of claim 16, wherein said at least one sensor includes a motion sensor.

25. In a vehicle having a vehicle body and a transmission having a plurality of gear settings, one of said gear settings being a park setting, said vehicle body defining a storage compartment with a compartment aperture and a closure member for selectively closing said compartment aperture, said closure member having a latching mechanism operable in a latched condition for retaining said closure member in a closed position substantially closing said storage compartment, said latching mechanism operable in an unlatched condition for permitting said closure member to be positioned in an open position substantially clearing said storage compartment, a method for releasing a living being trapped within said storage compartment comprising the steps of:

providing at least one sensor adapted for sensing the presence of said living being in said storage compartment;

determining whether said closure member is positioned so as to close said storage compartment;

if said closure member is positioned so as to close said storage compartment, determining whether said transmission is engaged in said park setting;

if said transmission is engaged in said park setting, providing power to said at least one sensor; and if said at least one sensor senses said living being, automatically generating an unlatch signal adapted for causing said latching mechanism to be positioned in said unlatched condition.

* * * * *